March 18, 1930.    F. SIMMER    1,751,459
PROCESS FOR BIOLOGICAL PURIFICATION OF WASTE WATER
Filed Jan. 13, 1928
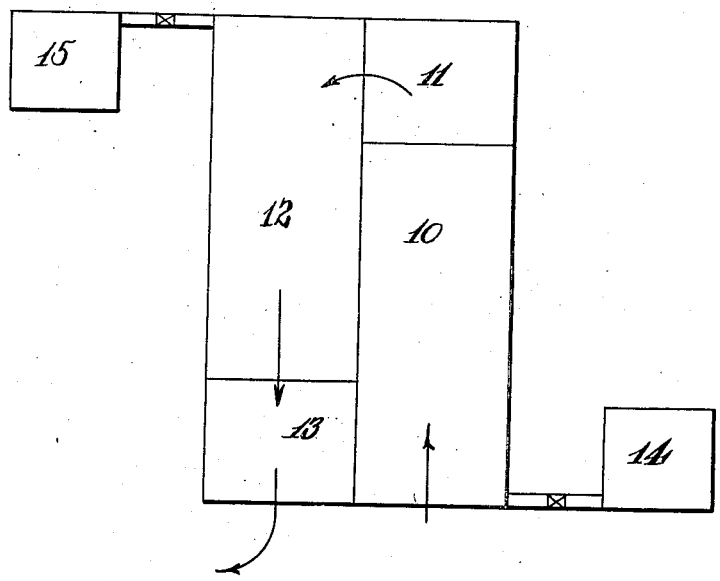
Inventor
FRITZ SIMMER.
By A. B. Foster
Attorney Reissued Mar. 18, 1930

1,751,459

UNITED STATES PATENT OFFICE

FRITZ SIMMER, OF LESIENICE, NEAR LWOW (LEMBERG), POLAND, ASSIGNOR TO AKTIESELSKABET DANSK GAERINGS INDUSTRI, OF COPENHAGEN, DENMARK, A JOINT-STOCK COMPANY

PROCESS FOR BIOLOGICAL PURIFICATION OF WASTE WATER

Application filed January 13, 1928, Serial No. 246,652, and in Austria March 2, 1926.

I have filed applications for this patent in Austria, March 2, 1926 and January 26, 1927; Germany, March 4, 1926 and January 31, 1927; Czechoslovakia March 1, 1927 and Poland March 11, 1926 and February 15, 1927.

This invention relates to the treatment of waste water and particularly to the purification of industrial waste water. Of all the various methods used for this purpose the biological or bacterial methods are those which are most frequently employed. Leaving apart the irrigation process and the intermittent soil filtration, which are not to be taken into consideration in so far as industrial waste waters are concerned, the biological purification is effected either by the septic tank process of purifying waste water in the course of which anaerobic bacteria are relied upon to convert putrescible organic matters in the waste water into a nonputrescible or innocuous condition, or else by means of biological filter beds, which latter method consists of causing the waste water to percolate through sand, beds of coke or other suitable material for the purpose of obtaining a purification of the waste water partly by adsorption and partly by the action of micro-organisms and low living beings. For the decomposition of the organic substances in the said biological filters aerobic micro-organisms are of greatest importance. Moreover the method commonly known as the activated sludge process may be mentioned, according to which a specially prepared bacterial sludge is by means of aeration or of agitators driven through the waste water.

The purification of waste water by the septic tank process has the drawback, that by the anaerobic decomposition of the organic substances badly smelling gases and substances are formed, the removal of which, as far as it is possible, requires expensive aeration plants. The filtration method is—it is true—odorless, but for carrying it out very large and expensive installations are necessary and all the same in the case of very contaminated waste waters a sufficient purification will not be obtained thereby. From the activated sludge method very large quantities of a thinly liquid sludge result which have to be subjected to putrefaction, so that also in this case all the inconveniences of the septic tank method are to be taken into the bargain. Moreover the latter method has up to the present only proved successful in the treatment of domestic or municipal sewage.

The endeavours made for improving these processes in general, aimed at maintaining within the sewage conditions favorable to the development of the spontaneously growing biological flora, (producing and maintaining a particular range of alkalinity or basicity, additive agents for maintaining within the sewage a favorable environment for the growth of appropriate micro-organisms etc.).

A special method of influencing the development of the biological flora consists in many of the apparatus for the biological purification being based on the principle of carrying out the process in two or more stages, in one or several of which the sewage is disposed, while out of contact with air (and light) in such manner, as to promote the growth of anaerobic bacteria, and in one or several of which the sewage is subjected to the action of air (and light) for the purpose of producing conditions favorable to the development of aerobic organisms, the aerobic process being either preceded by the anaerobic or vice-versa.

Besides these arrangements permitting of carrying out the treatment in two stages an anaerobic and an aerobic one it has also been suggested to use in bacterial purification processes "amphibious" micro-organisms, which had been prepared, by adaption, so, as to enable them to adapt themselves to variations of surroundings, so that they work sometimes as aerobic and sometimes an anaerobic organisms.

Further known processes for treating sewage, pursuing the same object, consist in combining the septic tank method with the activated sludge method as successive steps.

Moreover it has been proposed to divide bacterian chambers, in which anaerobic fermentation takes place, into a series of compartments successively traversed by the sewage and provided with baffle plates or zig-zag partitions for the purpose of rendering the flow of the sewage slow and prolonged and of permitting the anaerobic bacteria to completely do their work without being carried along or interfered with by the current of liquid.

A drawback common to all these biological processes hitherto known consists in that they are in accordance with the mostly very heterogeneous composition of the sewage working with accidentally developed associations of cultures of bacteria of most varying genus and species. Even if inoculating the sewage with some organisms had been suggested in prior processes, no advantageous results had been attributed to the predominance of any particular organism, much less, that account should have been taken of the biological specificness of the micro-organisms in relation to the nature of the impurities.

All symbiotically working methods are irrational for the reason that thereby the specific decomposing power of certain micro-organisms attacking particularly certain determined substances is left unutilized. On the contrary the decomposition due to the action of a plurality of more or less appropriate micro-organisms takes place in an uncertain, irregular and nonreliable manner and such process, considered from the technological point of view, is not far superior to the natural putrefying and decomposing processes. Whilst in other lines of the industries based on technical mycology, for instance in the fermentation industries, specific micro-organisms, and those produced by suitable cultivation in respect of certain properties influenced thereby are utilized to a large extent, this has hitherto not been done for the purpose of purifying waste waters. Filling up this gap is the most essential object of the present invention.

According to the present invention a rapid and thorough purification of the waste water is obtained by dividing the treatment of the waste water by micro-organisms according to the nature of the impurities contained therein into several stages, which stages first of all are established according to the biochemical main groups of the impurities contained in the water, and by bringing in each of these stages to predomination or to exclusive action aerobe or anaerobe micro-organisms particularly appropriate and intentionally chosen for the proceedings to be provoked and controlled in the respective stage, these micro-organisms being preferably propagated from a pure culture. Some or all of these stages may be divided again into sub-stages according to the intermediate proceedings of decomposition.

According to the nature of the impurities for instance pure cultures of the micro-organisms of the following groups may be employed:

1. Proteolytic, ammonia forming, ammonifying, nitrifying and denitrifying bacteria or mixtures of such bacteria.
2. Bacteria or fungi decomposing fat (yeasts and hyphomycetes).
3. Bacteria or fungi dissolving starch or decomposing dextrine and sugar.
4. Bacteria decomposing cellulose or pectin.

According to the nature of the waste water the different groups are adjusted in relation to one another in respect of kind and quantity, whereby under certain circumstances also different species of the same genus may be employed in mixture.

The propagation of the bacteria is carried out in the usual manner. For this purpose sterilized waste water of a concentration which is not too high is in a pure culture apparatus inoculated with the appropriate bacteria and maintained at a temperature which is most favorable for their growth. For carrying out the purification the waste water is mixed in open or closed tanks, clarifying vessels or basins with quantities of the culture thus prepared sufficient for ensuring an abundant development of the micro-organisms. For the purpose of obtaining a better distribution of the bacteria in the waste water the latter may be kept in motion either permanently or periodically by means of an agitator, by blowing in air or by any other suitable means.

Sometimes it may be advantageous to bring the bacteria destined for said purpose into the zoöglœa state or to use besides other bacteria also such which tend to turn into said zoöglœa state. When in this state the outer membrane of the bacteria is swelled up to a size which is a multiple of that of the bacteria. These membranes then form slimy lumps of a transparent glutinous intercellular mass resembling frog's spawn. It is just this jelly-like mass which by its adsorptive power most efficiently ameliorates the purifying action. Within this jelly-like mass, forming a sort of storage chamber for the bacteria, the substances adapted to be assimilated by the micro-organisms, are collected and utilized by them immediately or partly later on during the reactivation of the bacteria. In any case these substances required by the bacteria are withdrawn from the water.

The process may be carried out continuously by allowing the waste water to run successively through several clarifying vessels or basins in which the decomposition of the impurities takes place. Behind each clarifying vessel or basin a tank or basin for settling is inserted and in the settling basin the exhausted bacteria are removed from the liquid.

In the single clarification vessels or basins the conditions most favorable for the life of the micro-organisms are provided. Particularly the temperature and the hydrogen ion concentration of the liquid must be suitably adjusted.

If the waste water should perhaps be poor in some one of the nutriments necessary for the bacteria the equilibrium of the nutrimental substances must be established by the addition of the respective substances such as e. g. nutrimental salts, in order to obtain the best result of their biological activity. The exhausted aerobic bacteria can after removal from the liquid be reactivated by agitating them in a tank with fresh cold water under aeration in presence of salts giving off oxygen such as for instance potassium permanganate. If the bacteria are used up to such degree that reactivation is not possible any more, the sludge may be pressed to form cakes which can be utilized as fertilizer.

In the following example of carrying out the process it is assumed that the waste water to be purified contains as organic impurities albumen, starch, cane sugar and urea or related substances at a total concentration of 10 grammes per liter. The treatment of the water may according to the nature of the employed micro-organisms take place with an alkaline, neutral or acid reaction the hydrogen ion concentration may amount to the pH values between 8.6 and 6.2.

The starch contained in the waste water is exposed to the action of micro-organisms rapidly and completely decomposing it into glucose or maltose. Particularly adapted for this purpose are *Aspergillus orizae* or *Bacillus subtilis* or *Bacillus mesentericus*. These micro-organisms are allowed to act on the water at a temperature from 37 to 40° C., the water being thoroughly agitated from time to time. If one of the said two bacteria is used, it is advantageous to periodically aerate the water. For the aspergillus-species acid reaction of the water is most convenient and for the bacteria neutral reaction thereof is the most convenient.

After accomplishment of the saccharification the micro-organisms employed for this purpose are removed from the water by filtration, decantation or precipitation of voluminous deposits carrying down with them the microbes, or killed. Thereafter the glucose or maltose formed by the saccharification of the starch and the cane sugar originally present in the water are in known manner decomposed into carbonic acid and alcohol by means of a suitable pure culture of yeast. The generated carbonic acid will escape or when bound to some ions will remain within the liquid as carbonate. The generated alcohol owing to the degree of its dilution does not act at all dangerous in the basin inserted before the outlet (outlet receiver). Besides the amount of alcohol may be diminished by blowing in compressed air during the fermentation.

After these first two stages, by which the water has been freed of the starch and of any cane sugar, which may originally have been present in the waste water, the yeast is removed from the liquid as completely as possible by filtering or by means of a centrifugal machine. Now the steps necessary for mineralizing the remaining impurities, albumen and urea, may be undertaken.

For this purpose a pure culture of *Bacillus putrificus* or *vulgaris* is added to the waste water after its neutralization and these micro-organisms are allowed to act on the water at a temperature of about 35° C., whereby the albuminous substances are decomposed to aminoacids or fatty acids. Thereby the reaction becomes alkaline owing to the formation of carbonates and ammonia taking place along with said decomposition. Now an abundant amount of a pure culture of the *Bacillus mycoides* is introduced into the waste water, which causes the further decomposition of the aminoacids to ammonia. For the action of this bacillus the alkaline reaction produced in the preceding step is favorable.

Now the liquid contains substantially or mainly as impurities only ammonium salts, in first instance ammonium carbonate and small quantities of fatty acids, particularly formic acid. This acid can be decomposed by the action of the *Bacterium formicicum* to carbonic acid, hydrogen and methane. Finally the ammonium salts are oxidized by pure cultures of nitrosomonas and nitrobacteria.

Other ways than the one indicated hereinbefore may of course be followed in the biological decomposition, so for instance sugar and starch may be reduced to lactic acid, acetic acid and butyric acid instead of carbonic acid and alcohol. The direction, in which the process is to be conducted, is determined by different conditions or circumstances and also by the question, whether the one or the other of the intermediate products and which of them may not only be removed from the water but also recovered for some utilization. The bacteria required for the biological process can be easily isolated from humus, stable-manure, sludge from ditches, biological filters etc.

The described principles or fundamental rules for proceeding may also be combined with all the biological, chemical or colloidchemical methods for purifying waste waters, which are already known. So for instance from aluminium hydroxide or the like a sludge having an adsorptive property may be prepared and after having been inoculated with the respective pure culture of bacteria be used for the purification effected in the manner of the activated sludge process. Moreover also sterilized sand filters or coke beds inoculated with such pure cultures may render good service.

As is already to be seen from the foregoing, it is for the purpose of simplifying the process advantageous to conduct the decomposition so that of the different main substances originally contained in the water first of all as many as possible are worked up to one single biochemical intermediate product, which is then subjected to further decomposition, for instance starch and sugar into lactic acid. When the wrong bacteria are chosen, starch may for instance be converted into lactic acid and cane sugar into butyric acid, so that thereafter two different substances should have to be decomposed by different bacteria, which way of proceeding would of course complicate the process. Moreover one ought to endeavour to obtain in the biological process such intermediate products, for the decomposition of which the appropriate bacteria can easily be procured. Thus the result aimed at can be realized with great reliability and certainty. In contradistinction thereto the known biological processes only obtain such result after a time very much longer and by means of considerably larger plants.

According to a special mode of carrying out the process the industrial or municipal waste waters are as far as possible already from the very beginning divided according to the nature of the main groups of their impurities and are separately subjected to purification by bacteria. If for instance in an industrial establishment waste waters of different composition are running off at certain stages of the manufacture or if they are coming from different sources, it is advantageous to keep them separate according to their biochemical main groups and to subject each part separately to the biological purification. In all other respects the process remains as far as its principle is concerned, the same.

By the following the application of the process to the purification of waste water from industries working up molasses may be described.

As is known the purification of waste water strongly contaminated with organic substances such as result in industries involving the use of molasses (yeast manufactories, distilleries, sugar factories) is a problem hitherto not solved. Up to the present trials have been made for purifying waste waters from industrial establishments using molasses in septic tanks or beds of coke under aeration or without it. Moreover experiments have already been made with the activated sludge mehod. All these trials were failures and could not be successful with waste water, the organic impurities of which, expressed by the quantity of potassium permanganate consumed by one litre thereof, amounts to from 15,000 to 20,000 milligrammes, the corresponding number for municipal sewage being at the average 1000 milligrammes per liter. Moreover they could not succeed because the waste waters from molasses contain substances, the decomposition of which is very difficult. Putrifying such waste waters cannot give the result aimed at, because the substances contained therein at a relatively high concentration (alkaloids, betaines) are not attacked by bacteria except by certain well determined species thereof under the most favorable conditions. Moreover owing to the high content of sulphur compounds an abundant formation of hydrogen sulfide and of other organic as well as inorganic, badly smelling sulfur compounds takes place, which compounds not only render the surrounding air and the treated water itself unfit for consumption by human beings as well as by animals, but which also impede all biological activity within the putrefaction basin. All the known drawbacks of the septic tank process are multiplied when treating waste water from molasses owing to the proportion of impurities contained therein, which is about twenty times that of the above mentioned municipal sewerage. The aerobic purification methods failed moreover owing to the impurities being attacked only with greatest difficulty and also owing to the high costs of the installation and of working the plants necessary therefor.

All these difficulties are overcome by applying the present process to this kind of waste waters.

The impurities contained in the waste waters from industrial establishments using molasses belong to the following biochemical main groups:

1. Betaine substances, the nitrogen contents of which amount to about 75% of the entire nitrogen contents of the waste water,
2. Albumen, in the case of spirit distilleries and yeast manufactories mainly present in the more or less destroyed yeast cells,
3. Vegetable acids chiefly of a volatile nature, in the first instance formic acid,
4. Humin substances, which themselves are not obnoxious, but cause the brown color of the waste water, and
5. Sulfur compounds, in first line sulfates.

According to the present process the betaine substances are removed from the waste water by the vital activity of aerobic or anaerobic micro-organisms decomposing betaine, for which purpose advantageously a portion of pure cultures of suitable microorganisms is, prior to the introduction into the decompositing basin, subjected to propagation under the most favorable conditions for their growth in a separate receptacle, thus constituting a culture stock (starting stock) or "setting on" portion. By the action of the bacteria thus cultivated the decomposition of the betaine as well as that of its derivatives and transformation products into carbonic acid, ammonia and formic acid can be realized effectively. Thereafter in a second stage the vegetable acids, particularly the formic acid, are removed from the waste water in an analogous manner by bacterial decomposition. The humin substances, causing in the first instance the brown color of the waste water, may remain undecomposed, if the color of the water in the outlet receiver does not matter for esthetic or other reasons. But for use in dye-works, laundries, bleaching works and like establishments such waste water would not be suitable. If it is desired to decolorize the waste water this can be effected easily by decomposing the humin substances completely by means of specifically appropriate micro-organisms. As the latter act very favorably with the bacteria decomposing betaine as well as with those decomposing formic acid, the decomposition of the humin substances may be combined either with the decomposition of the betaine or with that of the formates in the same stage.

The proportion of albumen contained in the molasses is, provided that the manufacturing operation had been carried out correctly, so insignificant, that in general it may be neglected altogether. But if necessary or desirable, the decomposition of the albumens into inorganic compounds by means of albumen decomposing micro-organisms such as *Bacillus micoides*, *Bacillus putrificus*, *Bacillus mesentericus* or *Bacillus vulgarus* can be carried out prior to the other steps. As the albuminous substances are in the waste waters from fermentation industries almost exclusively contained in the form of yeast cells, it is advantageous to remove the latter a priori from such waste water by mechanical separation, for instance by means of a small filter mounted in the main duct conveying the waste water. Thereafter the cells are killed, in a known manner, e. g. by plasmolysis or heating and finally decomposed into inorganic compounds by means of an efficient albumen decomposer, preferably added in the state of pure culture.

Of the sulfur compounds about 90% are sulfates. They are, if the degree of dilution is sufficient, not particularly obnoxious in the outlet receiver, but are most obnoxious in the purifying process itself, when they are reduced to hydrogen sulfide by the bacteria. According to the present invention this can be avoided by preventing the decomposition of sulfates into hydrogen sulfide by the selection of appropriate pure cultures and by carrying out the operations under sterile conditions. As the reducing action of bacteria on sulfurous substances is no doubt a specific feature of certain microbes only (for instance *Microspira desulphuricans*, *Microspira aestuarii*), the said conditions can be maintained during the process without great difficulty. But if the conditions in the outlet receiver are exceptionally unfavorable, it is preferable to remove the sulfates from the molasses and prevent, by suitably conducting the manufacture operations, sulfates from passing over into the waste water, or else to precipitate the sulfates contained in the waste water in the form of insoluble salts prior to the starting of the biological process.

The decomposition of the betaine can be effected as above stated by means of anaerobic or aerobic micro-organisms. The appropriate micro-organisms may be separated from others for instance by inoculating a concentrated solution of betaine salts with putrescent beetroots or with molasses when in the state of decomposition, thus preparing a natural pure culture, from which the appropriate species are selected in known manner by propagation on a betaine containing nutrient medium. According as the conditions are maintained either anaerobic or aerobic, so the developed betaine decomposers will be anaerobic or aerobic. In such a manner for instance an anaerobic betaine decomposing bacterium has been selected, which has the form of little rods with rounded edges. Stick-cultures (i. e. stab-cultures) grow on gelatine prepared with waste water from molasses moniliform with needle-like extensions on each single globule. The culture has no liquefying properties and does not form carbonic acid in normal wort gelatine or very little, but provokes strong gas development in betaine containing gelatine. Another bacterium, an aerobic one, has the form of fine small rods which are frequently grown together at one end so as to form a radiate body. It forms spores and appears, excepting as to its form, to be related to the hay-bacillus group. By means of the aerobic bacterium a more rapid decomposition of the betaine can be brought about. For less concentrated waste waters, in particular such for instance as yeast waters, the working with such aerobic betaine decomposers is to be preferred to the working with anaerobic ones. The way of operating is substantially the same for both kinds, except that when aerobic bacteria are used, a certain amount of air has to be blown into the decomposition basin. Aerobic microbes can be reactivated by aeration in pure water, in which salts giving off oxygen are dissolved, or by blowing oxygen or oxygen containing gases into the water containing them, but a repeated use of the same bacteria is advisable only, if they are perfectly free of infection.

The best manner of obtaining humin decomposing microbes consists in inoculating a concentrated solution of a humate prepared from "acidum huminicum Merck" with forest or garden earth. From the natural pure cultures thus developed the suitable species are then separated by known methods on a solid humin containing nutrient medium. In this manner the pure culture of a bacillus is obtained, which grows in the form of relatively large rods with rounded edges, forms spores and decolorizes solutions of humates to such extent that only a yellowish tinge remains.

For decomposing the vegetable acids, particularly the formic acid, any of the known micro-organisms, for instance the *Bacterium formicicum* described by Omelianski may be employed. The humin substances and formates are decomposed by the anaerobic way.

In all cases the destructive action of the microbes can be advanced and intensified by employing exclusively or partly such microbes, which are in the zoögloea state or else by employing amongst others bacteria, which tend to pass into the zoögloea form. Furthermore the action of the bacteria may be stimulated and increased by provoking the formation of voluminous precipitates in the fermenting waste water or by introducing such sediments or other indifferent highly porous bodies, e. g. saw-dust, into the decomposition basin. The process may be carried out in apparatus shown diagrammatically in the annexed drawing, showing a plan of a plant.

The waste water, by filtration or setting free of the solid substances carried by it, is neutralized by means of lime milk and run into a decomposing basin 10. This basin ought to be, if possible, placed in the ground, closed up so as to assure perfect sterility, provided with an outlet for the gases and of such size, that it can hold at least the fourth part of the entire quantity of waste water to be treated during one day. To this first decomposing basin a small shallow clarifying basin 11 is joined, the bottom of which forms a flat funnel for the settling bacteria. From there the waste water is led into a second decomposing basin 12 with a settling basin 13 joined thereto. To the waste water when contained in the first basin 10 according to the requirement, for instance once a week, a starting stock of betaine bacteria, propagated from a pure culture in a third vessel 14 connected to the first basin is added. The capacity of this latter vessel is about 1/6 of that of the decomposing basin. If the most favorable temperature of 36° C. is maintained, if moreover the concentration of the waste water is as high as possible and the reaction is neutral or slightly alkaline, the liquid will very rapidly come into the state of fermentation. The admission of waste water is going on continuously. Within a period of time from 2 to 8 hours the betaine will be perfectly decomposed into carbonic acid, ammonia and formic acid. The mass of the bacteria which have settled in the clarifying basin 11 is pumped back into the first quarter of the decomposing basin. The liquid freed of the greatest part of the bacteria flows now into the second decomposing basin 12 and is here mixed with a pure culture of *Bacterium formicicum* Omelianski, which had been propagated in a fourth receptacle 15. In the second decomposing basin 12 the temperature may be somewhat lower than in the betaine decomposing basin, all the other conditions are the same. When a fresh pure culture is added, a short stimulation of the bacteria by aeration is advantageous. Phosphates added to the water in this basin have an accelerating action. The formates are completely decomposed and a solution of carbonates and ammonium salts flows off, which can without any further treatment be run into the outlet receiver. If in the latter the conditions are very unfavorable, for instance owing to scarcity of water, a short supplemental treatment of the waste water in a fish-pool with a quantity of water at least five times that of the waste water to be treated during one day may follow, but it is not indispensable. If decolorization of the water is desired, humin decomposing microbes may be added in the first or second decomposing basin, as these bacteria do not disturb the action of the betaine decomposing nor the formate decomposing microbes.

In operating with pure cultures it is of course essential, that the waste water, when introduced into the decomposition plant, should be as far as possible free of germs. Inasmuch as waste water from spirit distilleries and yeast manufactories is concerned, answering this condition is relatively easily fulfilled, as the greatest part of the waste water comes from the distillation still in a sterilized state. It is therefore necessary only to ensure, that the pipes are kept as clean as possible. In other cases it may be advisable to sterilize the waste water prior to introducing it into the decomposing plant, which sterilization may be effected without incurring heavy costs for instance by treatment with chlorine and subsequent freeing therefrom by means of an antichlor. From concentrated waste waters such as for instance those of spirit distilleries ammonia adapted for commercial utilization may be recovered in an economical manner.

Finally it may be mentioned here, that previously for the purpose of obtaining a stable, nonhydroscopic, easily disseminable fertilizer it has been proposed to subject a mixture of peat and residues of molasses to a fermentation by betaine decomposing bacteria, until the decomposition of the nitrogen bases by the bacteria into nonhygroscopic compounds is accomplished. For the purification of waste water from industrial establishments involving the use of molasses no utilizable hints have been derived from this disclosure.

I use the term "sewage" to include domestic or municipal sewage and refuse liquids of all kind especially waste water from industrial works.

The term "betaine" is used to include the derivatives and transformation products of betaine. In this specification, I use the term "pure cultures" to cover both cultures prepared in the laboratory which are absolutely pure and such naturally occurring cultures as are substantially pure.

What I claim is:

1. The method of treating sewage which comprises subjecting the same to biological action in a plurality of successive metabiotic stages corresponding respectively to each of the main biochemical groups of the impurities contained in the sewage, wherein the sewage is acted upon by adding thereto at such successive stages particular micro-organisms specifically active for decomposing such particular main groups of polluting contents in the sewage, which particular organisms are brought to predominance within the said respective stages.

2. That step in the process as specified in claim 1, which consists in employing micro-organisms, which are inclined to the formation of the zoöglœa state.

3. That step in the process as specified in claim 1, which consists in employing micro-organisms which previously have been brought into the zoöglœa state.

4. The method of treating sewage which comprises subjecting the sewage to biological action in a plurality of successive metabiotic stages corresponding respectively to each of the main biochemical groups of the impurities contained in the sewage, wherein the sewage is acted upon by adding thereto at successive stages particular micro-organisms specifically active for decomposing such particular main groups of polluting contents in the sewage, which particular organisms are cultivated from a pure culture and brought to predominance within the said respective stages.

5. The method of treating industrial sewage which comprises subjecting the sewage to biological action in successive metabiotic stages corresponding to the main biochemical groups of impurities contained in the sewage, which stages are divided again into metabiotic sub-stages according to the process, in the sub-stages of the biological decomposition, the sewage being acted upon within the said stages by particular micro-organisms specifically active for decomposing particular main groups of polluting contents of the sewage, and within the said sub-stages by micro-organisms specifically decomposing intermediate products of the biological decomposition of the main groups of the impurities and bringing said micro-organisms to predominance within the said stages and sub-stages, respectively.

6. The method for the biological purification of sewage which comprises dividing the bacterial treatment into metabiotic stages corresponding respectively to the main biochemical groups of the impurities contained in the sewage, and furthermore corresponding to the intermediate products of the biological decomposition of the said main groups of the polluting contents, and inoculating the sewage with micro-organisms particularly adapted and intentionally chosen for the respective stages.

7. The method for the biological purification of industrial sewage which comprises keeping separate from each other different portions of the sewage containing different main groups of impurities during the course of the manufacturing process of the industrial plant from which the sewage originates, and separately subjecting such portions to biological action of micro-organisms specifically active for decomposing the polluting contents of the respective portions of the sewage.

8. That step in the process as specified in claim 7 which consists in that the bacterial purification of each of the said portions is divided again into metabiotic sub-stages according to the intermediate progress of the biological decomposition of the main groups of impurities contained in the respective separate portions of the sewage.

9. A process for the biological purification of sewage from industrial plants using molasses in large amounts, which comprises freeing the sewage from betaine by the addition and action of a pure culture of micro-organisms specific in their action to effect the decomposition of betaine.

10. In the process according to claim 9, the herein described improvement which comprises cultivating starting stock of micro-organisms specifically active for decomposing betaine, in a culture medium containing substantial amounts of betaine, and adding said stock to said sewage containing betaine.

11. In the purification of sewage from industrial works using molasses in large amounts, the herein described improvement which comprises decomposing the betaine in the sewage by bacterial action of a pure culture of betaine decomposing micro-organisms, into carbonic acid, ammonia and a lower fatty acid.

12. In the purification of sewage from industrial works using molasses in large amounts, the herein described improvement which comprises decomposing the betaine in the sewage by bacterial action of a pure culture of betaine decomposing micro-organisms, into carbonic acid, ammonia and a lower fatty acid and thereafter decomposing said lower fatty acid by bacterial decomposition, in a separate stage.

13. In the purification of sewage from industrial works using molasses in large amounts, the herein described improvement which comprises decomposing the betaine in the sewage by bacterial action, into carbonic acid, ammonia and a lower fatty acid, and thereafter decomposing the humin by bacterial decomposition in a separate stage.

14. In the purification of sewage from industrial works using molasses in large amounts, the herein described improvement which comprises decomposing the betaine in the sewage by bacterial action, into carbonic acid, ammonia and a lower fatty acid and thereafter decomposing the humin by bacterial decomposition in a separate stage and thereafter decomposing said lower fatty acid in a separate stage.

15. In the purification of sewage from industrial works using molasses in large amounts, the herein described improvement which comprises subjecting the sewage to decomposition by micro-organisms which have specific decomposing action on the albumins present in the sewage, and thereafter subjecting the sewage to decomposition by micro-organisms which have specific decomposing action on betaine.

16. Process as in claim 15, in which the micro-organisms specifically decomposing betaine are such as will form carbonic acid, ammonia and a lower fatty acid.

17. Process as in claim 15, in which micro-organisms capable of decomposing humin are present and active during the action of the betaine-decomposing micro-organisms.

18. A process as in claim 15, followed by a separate stage in which lower fatty acids formed by decomposition of the betaine, are decomposed in a separate stage by bacterial decomposition.

19. In the purification of sewage from industrial plants using molasses as raw material, the herein described process which comprises decomposing albumins present in the sewage by action of micro-organisms having a specific decomposing action thereon, thereafter in a separate stage decomposing betaine into carbonic acid, ammonia and a lower fatty acid by action of micro-organisms having a specific decomposing action thereon while simultaneously decomposing humin substances by action of micro-organisms having a specific decomposing action thereon, and thereafter in a separate stage decomposing the lower fatty acid by action of micro-organisms having a specific decomposing action thereon.

20. A process as in claim 19, in which all of the micro-organisms used are such as are free from reducing action on sulphates, whereby no hydrogen sulphide is set free during the treatment of the sewage.

In testimony whereof I have affixed my signature.

Dr. FRITZ SIMMER.